Patented Dec. 11, 1934

1,984,126

UNITED STATES PATENT OFFICE 1,984,126

PREPARATION OF ACETONE-SOLUBLE CELLULOSE NITRO-ACYLATE

James T. Fuess and Cyril J. Staud, Rochester, N. Y., assignors to Eastman Kodak Company, Rochester, N. Y., a corporation of New York No Drawing. Application December 31, 1930, Serial No. 505,962

5 Claims. (Cl. 260—101)

This invention relates to a process of preparing acetone-soluble cellulose nitro-acylate which comprises adding an acyl anhydrid and an oxide of nitrogen to a cellulosic material and then heating the reaction mass to approximately 100° C. preferably in the presence of a catalyst.

An object of this invention is to provide a process in which the conversion of cellulose to cellulose nitro-acylate takes place in a much shorter time than that usually required for this reaction.

Another object of the invention is to provide a process which produces a cellulose nitro-acylate which is of a comparatively low viscosity for a derivative of cellulose. The advantages of this feature are obvious to those familiar with cellulose technology in the manufacture of various commercial products from the esters of cellulose.

Another object of our invention is to provide a process of making cellulose nitro-acylate by the use of oxides of nitrogen in which the oxide which is in excess is expelled, thus leaving a nitro-acetate which is free of detrimental impurities.

The general esterification procedure to be followed in the present process is that disclosed in U. S. application of J. T. Fuess and C. J. Staud, Serial No. 505,963. That application shows the simultaneous nitration and acylation of cellulose with an oxide of nitrogen and an acid anhydride. The present process presents the improvement of this prior process which comprises heating the reaction mass to approximately 100° C. after the addition of the nitrating agent which gives even better results than the prior process referred to as well as a shortening of the reaction time. In addition our process allows the recovery of any unused $NO_2$ in the reaction mass, which $NO_2$ may be used in a subsequent esterification.

An example illustrative of our invention applied to the making of cellulose nitro-acetate is as follows:

About 100 lbs. of cellulose (cotton linters preferred) is treated for approximately 18 hrs. at 20-25° C. with a mixture of approximately 700 lbs. of glacial acetic acid and a small amount of a catalyst ($1H_2SO_4:3H_3PO_4$ preferred). About 300 lbs. of acetic anhydride (85% strength) are stirred into the mixture and about 20 lbs. of liquid $NO_2$ are then added. After about 30 minutes the temperature is raised to 100° C. The mass is then allowed to cool and if desired may be diluted with acetone, precipitated in water and dried.

The acetone solution of this material was found to be of comparatively low viscosity, i. e., considerably lower viscosity than results when following this acetylation procedure without employing the heating step of our invention. The $NO_2$ driven off by the heating may be collected by vacuum withdrawal, for instance, and reliquefied for use in the next carrying out of the present process or for any purpose desired. By this method there is no less incident to the use of $NO_2$ as the nitrating agent, as it may be used repeatedly until taken into combination with cellulose.

Our invention contemplates the acylation of cellulose in the presence of an oxide of nitrogen at a temperature below the boiling point of the oxide and then heating to about 100° C. which was found to further the reaction and to drive off the free oxide of nitrogen present.

It is to be understood that other aliphatic acid anhydrides may be used in this process, especially those containing acyl groups of less than 7 carbon atoms selected from either the fatty acid series or the oleic acid series.

As mentioned previously the various oxides of nitrogen may be used for nitration instead of $NO_2$ or $N_2O_4$ such as for example $N_2O_3$ or $N_2O_5$. Obviously if $N_2O_3$ is used the temperature of the reaction mixture must be lowered to a temperature at which it will not be driven off until after the reaction mass is subjected to the heating to 100° C.

Various kinds of cellulosic material such as long cotton fibers, scrap cotton, high grade wood pulps etc. may be used instead of cotton linters if desired in the process of this invention.

What we now claim as our invention and desire to secure by Letters Patent of the United States is:

1. A process of making a cellulose nitrate acylate which comprises treating cellulose in a liquid bath comprising an aliphatic acid anhydride and a nitrating agent selected from the group consisting of $NO_2$ or $N_2O_4$, $N_2O_3$ and $N_2O_5$ and then heating to a temperature of approximately 100° C.

2. A process of making a cellulose nitrate acetate which comprises treating cellulose with acetic anhydride and liquid $NO_2$ and then heating to a temperature of approximately 100° C.

3. A cyclic process of making cellulose nitrate acylate which comprises acylating and nitrating cellulose in a liquid bath comprising an organic acid anhydride and $NO_2$ respectively, and heating to a temperature of approximately 100° C., collecting the $NO_2$ vapors given off, liquefying the $NO_2$ collected and acylating and nitrating cellulose with an organic acid anhydride and liquid $NO_2$ part of which was collected from the previous reaction.

4. In a process of making cellulose nitrate acylate, the step which comprises heating a mixture of cellulose, organic acid anhydride and liquid $NO_2$ to approximately 100° C.

5. In a process of making cellulose nitrate acylate, the step which comprises heating a mixture of cellulose, organic acid anhydride and liquid $NO_2$ to approximately 100° C. and collecting the $NO_2$ vapors given off.

JAMES T. FUESS.
CYRIL J. STAUD.